United States Patent

[11] 3,634,728

[72] Inventor Pierre Moury
 Paris, France
[21] Appl. No. 54,154
[22] Filed July 13, 1970
[45] Patented Jan. 11, 1972
[73] Assignee Jeumont-Schneider
 Paris, France

[54] CURRENT CHOPPER FOR DC MACHINES CONNECTED TO THE TERMINALS OF A SOURCE HAVING AN INDUCTIVE IMPEDANCE
2 Claims, 3 Drawing Figs.

[52] U.S. Cl............................................. 317/16,
 307/240, 321/45 C
[51] Int. Cl......................................... H03k 17/08
[50] Field of Search........................................ 307/240;
 321/43, 45 C, 10; 317/16

[56] References Cited
UNITED STATES PATENTS
| | | | |
|---|---|---|---|
| 3,487,234 | 12/1969 | Morgan | 321/43 X |
| 3,321,697 | 5/1967 | Etter | 321/45 C |
| 3,382,409 | 5/1968 | Assow et al. | 317/16 |
| 3,325,718 | 6/1967 | McNulty | 307/240 X |

Primary Examiner—James D. Trammell
Attorney—Raymond A. Robic

ABSTRACT: A current chopper for DC machines connected to the terminals of a source having an inductive impedance such as a traction powerline. The chopper comprises a filter connected between the source and the switching devices of the chopper, a power dissipating circuit connected in parallel with the main circuit and located between the filter and the above-mentioned switching devices of the chopper. The power dissipating circuit is connected and disconnected from the circuit by means of a switching device connected in series with the power dissipating circuit. The chopper further comprises a control and protection logic device controlling the operation of the chopper by detecting the abnormal operations thereof such as overcurrents and overvoltages, and by causing their cancellation by limiting the overvoltages resulting therefrom, in normal operation, by decreasing the current in accordance with a predetermined law and, in abnormal operation, by instantaneously blocking the chopper and simultaneously inserting across the source of power dissipating circuit.

INVENTOR
Pierre MOURY
BY
Raymond A. ...
ATTORNEY

CURRENT CHOPPER FOR DC MACHINES CONNECTED TO THE TERMINALS OF A SOURCE HAVING AN INDUCTIVE IMPEDANCE

This invention relates to a current chopper for DC machines connected to the terminals of a source having an inductive impedance, which machines being capable of operating as well as motors or generators. The invention is more particularly applicable to machines used for power traction.

Choppers are known which permit the regulation of the DC current provided by a fixed voltage source to an inductive utilization circuit. Such choppers consist in an electronic interrupter operating at a constant closing rate and having an adjustable closure time, such electronic interrupter being equipped with thyristors one of which is used to close the circuit and is cut off by applying an inverse current provided by a condenser or an oscillating circuit through another thyristor called extinction thyristor. The inductive utilization circuit is shunted by a diode which permits to the current to continue to flow during the periods of nonconduction.

When the utilization circuit consists of traction motors, which is almost always the case, it is necessary to install between the chopper and the powerline (catenary or rail) a filter consisting of an inductance and a condenser in order to limit the amplitude of the overvoltages applied to the terminals of the equipment and the flow of spurious currents liable to disturb the operation of the installation itself or of neighboring installations (electromagnetic disturbances). Indeed, due to its own operation, the chopper generates sudden variations in the current absorbed or provided by the source, which variations cause overvoltages to the terminals of the filter which necessitate to design such filter accordingly, and also causes the return towards the source of spurious currents having a fairly wide range of frequencies.

On the other hand, in order to permit the traction motors to operate as generators to provide regenerative braking even when the source may not absorb it (insufficient or excessive voltage, opening of the circuit), a power dissipating circuit consisting of resistances is normally branched to the terminals of the traction machines.

In the known choppers, the size of the various elements of the circuit is essentially a function of the overvoltage level allowed at the terminals of the chopper. A relatively low level of overvoltage (two to 2.5 times the nominal voltage of the machine) permits an economical manufacture of a chopper but generally requires a heavy filter which is cumbersome and expensive.

A higher level of overvoltage level permits the design of a filter of smaller dimensions but causes a substantial increase of the price of the chopper as soon as the nominal voltage of the machine is of the order of a few thousand volts.

The device in accordance with the invention permits to overcome the above drawbacks. In such device, it is indeed possible to lower the overvoltages at the terminals of the current chopper and to design the equipment for a moderate overvoltage level while using a filter of small dimensions, which permits substantial savings on the filter and on the chopper.

The object of the present invention is therefore an improvement over the current choppers for DC machines connected to the terminals of the source having an inductive impedance, such as a traction power line.

The chopper, in accordance with the invention, comprises:
a filter connected between the source and the switching devices of the chopper;
a power dissipating circuit connected across the main circuit and located between the filter and the above-mentioned switching devices of the chopper, said power dissipating circuit being connected to or disconnected from the circuit by means of a switching device connected in series with such power dissipating circuit;
a control and protection logic circuit controlling the operation of the chopper by detecting its abnormal operations (such as overcurrents and overvoltages), and by limiting the overvoltages resulting therefrom either, in normal operation, by causing the decrease of the current in accordance with a predetermined law or, during abnormal operations, by causing the instantaneous blocking of the chopper and the simultaneous connection of the power dissipating circuit.

In accordance with another embodiment of the invention, the switching device in series with the power dissipating circuit may consist of a thyristor without extinction circuit, the extinction of the thyristor being caused by the opening of a circuit breaker connected on the main circuit of the chopper.

The invention will be more easily understood with reference to the following description of the preferred embodiments thereof and to the accompanying drawings in which.

Figure 1:
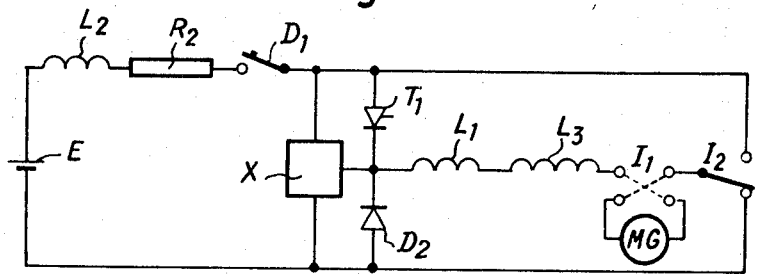
FIG. 1 illustrates the schematical diagram of a known installation of a current chopper for DC machines used on traction powerlines.

FIG. 1 illustrates a fixed DC source represented by an electromagnetic force E but consisting in fact of the catenary of a traction powerline, the inductances $L$, and the resistance $R_2$ of such source, a circuit breaker $D_1$ permitting to disconnect the machine from the source, and a chopper consisting of an extinction circuit X, of a smoothing inductance $L_1$, of a thyristor $T_1$ and of a current return diode $D_2$. In addition, FIG. 1 illustrates the traction machine MG with its inductor connected in series in the example shown, and two current inverters $I_1$ and $I_2$ permitting to obtain for both directions of rotation of the machine the operation of such machine as a motor and as a generator.

Figure 2:
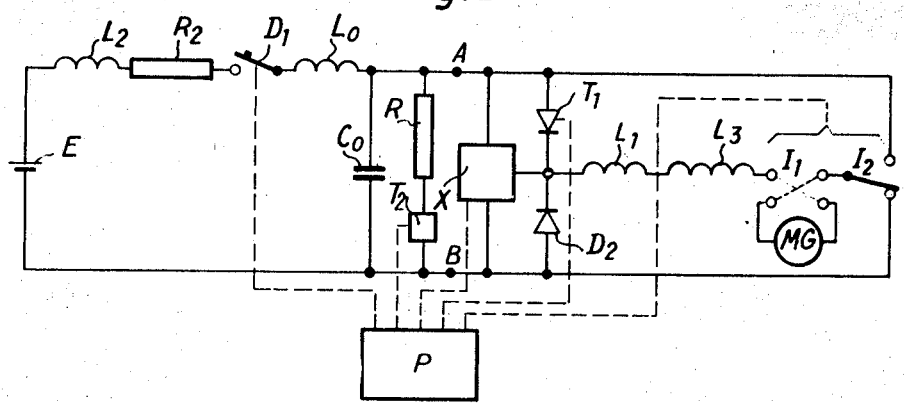
FIG. 2 illustrates a first embodiment of a chopper in accordance with the invention.

FIG. 2 illustrates a portion of the elements of FIG. 1 to which are added a filter consisting of an inductance $L_0$ and a capacitor $C_0$, a power dissipating circuit comprising a resistor R and a switching device $T_2$ connected across terminals A and B of the current chopper, and a control and protection logic circuit P which is connected to the circuit breaker $D_1$, to the triggering electrode of thyristor $T_1$, to the control terminal of switching device $T_2$, to the extinction circuit X and finally to the current inverters $I_1$ and $I_2$.

The control and protection logic circuit P controls the operation of the chopper by detecting its abnormal operations (such as overcurrents and overvoltages) and limits the overvoltages which may result therefrom either, in normal operation, by causing the decrease of the current in accordance with a predetermined law or, in abnormal operation, by causing the instantaneous blocking of the chopper and the simultaneous insertion of a power dissipating circuit in place thereof.

Figure 3:
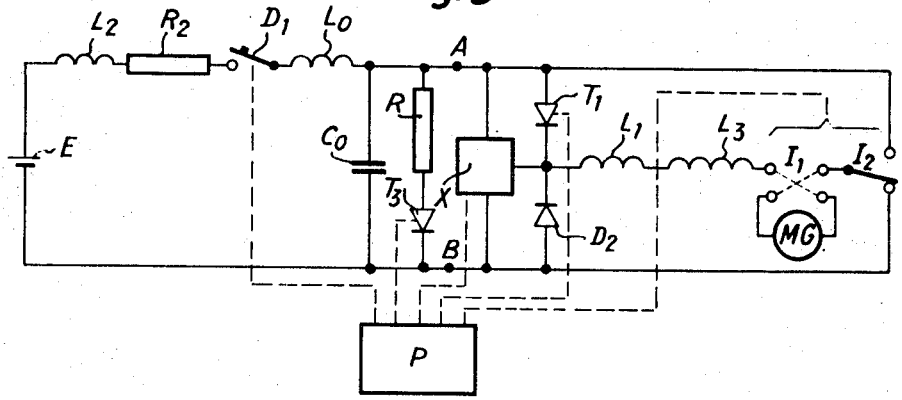
FIG. 3 illustrates a second embodiment of a chopper in accordance with the invention.

FIG. 3 is similar to FIG. 2 except that the switching device $T_2$ is a thyristor $T_3$ the triggering electrode thereof is connected to logic circuit P.

The operation of the chopper in accordance with the invention will now be disclosed with reference to FIG. 3 and in considering the two possible operations of the DC machine MG, that is as a generator and as a motor. When the DC machine operates as a generator, the power delivered by the machine which is regulated by the operation of the chopper is fed to the source E. If for any reason, the source may not absorb the power generated by the DC machine, the voltage VA–VB to the terminals A and B of the chopper increases due to the charge of the capacitor $C_0$ of the filter. When such voltage reaches a permissible limit or any preset value lower than such limit, it produces the firing of thyristor $T_3$ and the insertion of the resistance R the value of which is determined so that the voltage at the terminals thereof does not exceed the permissible limit value for the chopper. It is generally desirable to simultaneously cause, in such case, the opening of circuit breaker $D_1$ to prevent, in the case of a decrease of the power provided by the machine, and eventual flow of power from the source to the resistor R.

It is to be understood that the above may be combined with any form of regulation of the electromagnetic force of the machine MG.

In the case of the operation of the machine as a motor, the overvoltage at the terminals A and B of the assembly of the chopper and the machine being proportional to the ratio $\sqrt{(L_0+L_2)/C_0}$ and to the variation of the current caused by the chopper, at any value of such a ratio and hence at any dimensions of the filter, corresponds a permissible maximum value of the variation of the current caused by the chopper.

For a machine of a given power, such current variation is function of the control of the chopper and reaches its maximum value when the chopper, at maximum conduction for the permissible maximum current of the machine, cuts such current and is not put into conduction again.

The corresponding overvoltage decreases substantially if such current, instead of being suddenly cut, is progressively brought back to zero by a linear or almost linear decrease thereof in a time which is approximately equal to the period $2\pi \sqrt{(L_0+L_2) C_0}$ which may be easily obtained by a judicious choice of the control logic of the chopper.

The above process is put into operation each time that the operation of the machine necessitates a modification of the operation of the chopper but does not necessitate a rapid variation of such operation (regulation, normal stopping ...).

But there are cases in which the cutting of the current must be effected as quick as possible if it is desired for the chopper to perform a very rapid protection function (in case of arcing of the machine, for example).

A sudden cutting of the current is then made by blocking the chopper but in limiting the overvoltage (which could in these conditions reach nonpermissible values) by the insertion of the power dissipating device by causing the conduction of thyristor $T_3$ as soon as the voltage VA–VB reaches a predetermined value. Such cases being relatively rare, it is possible to simultaneously cause the opening of circuit breaker $D_1$ which permits to not equip the thyristor $T_3$ with any extinction circuit.

By the combination of the control function of the chopper (during normal operation thereof) and of the use of the power dissipating device as a voltage limiter (during abnormal conditions), it is therefore possible to dimension the equipment for a moderate overvoltage level with a filter which is smaller, thus resulting in substantial savings on the filter as well as on the chopper.

The invention does not only apply to traction machines but to any DC machine.

I claim:

1. A current chopper for DC machines connected to the terminals of a source having an inductive impedance, comprising:

a. a filter connected between the source and the switching devices of the chopper, said filter including a capacitor connected across the source for limiting the amplitude of the overvoltages at the terminals of the switching devices of the chopper, b. a power dissipation device connected in series with a switching device across the source and located between said filter and the switching devices of the chopper, said power dissipating circuit being connected to and disconnected from the source by means of said switching device, and c. a control and protection logic circuit controlling the operation of the chopper by detecting its abnormal states of operation due to overcurrents and overvoltages and causing the cancellation thereof by limiting the overvoltages resulting therefrom either, in normal operation, by decreasing the output current of the chopper in accordance with a predetermined law, or during abnormal conditions causing overvoltages across the capacitor of the filter, by the insertion of said power dissipating circuit in place thereof, thereby permitting the use of a filter of smaller dimensions.

2. A chopper as defined in claim 1, wherein the switching device in series with the power dissipating circuit is a thyristor without any extinction circuit, and wherein the extinction of said thyristor is performed by means of a circuit breaker connected in series with said source and operated by said control and protection circuit.

* * * * *